(12) United States Patent
Gwozdz et al.

(10) Patent No.: US 9,098,481 B2
(45) Date of Patent: Aug. 4, 2015

(54) INCREASING ACCURACY IN DETERMINING PURPOSE OF FIELDS IN FORMS

(75) Inventors: Daniel Gwozdz, Fall City, WA (US); Adrian Chandley, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1424 days.

(21) Appl. No.: 11/818,614

(22) Filed: Jun. 15, 2007

(65) Prior Publication Data

US 2008/0313529 A1 Dec. 18, 2008

(51) Int. Cl.
*G06F 17/21* (2006.01)
*G06F 17/24* (2006.01)

(52) U.S. Cl.
CPC .................... *G06F 17/243* (2013.01)

(58) Field of Classification Search
CPC ...................................................... G06F 17/243
USPC ......................................................... 715/224
See application file for complete search history.

(56) References Cited

U.S. PATENT DOCUMENTS

| | | | |
|---|---|---|---|
| 5,794,259 A | 8/1998 | Kikinis | |
| 5,991,469 A * | 11/1999 | Johnson et al. | 382/317 |
| 6,088,700 A | 7/2000 | Larsen et al. | |
| 6,192,380 B1 | 2/2001 | Light et al. | |
| 6,199,079 B1 | 3/2001 | Gupta et al. | |
| 6,345,278 B1 | 2/2002 | Hitchcock et al. | |
| 6,490,601 B1 | 12/2002 | Markus et al. | |
| 6,651,217 B1 | 11/2003 | Kennedy et al. | |
| 6,662,340 B2 | 12/2003 | Rawat et al. | |
| 6,910,179 B1 | 6/2005 | Pennell et al. | |
| 7,779,345 B2 * | 8/2010 | Topalov et al. | 715/224 |
| 8,327,258 B2 * | 12/2012 | Sini | 715/221 |
| 2003/0105760 A1 * | 6/2003 | Sini | 707/10 |
| 2004/0030991 A1 * | 2/2004 | Hepworth et al. | 715/507 |
| 2004/0205530 A1 * | 10/2004 | Borg | 715/507 |
| 2004/0260594 A1 * | 12/2004 | Maddox, Jr. | 705/9 |
| 2005/0028082 A1 * | 2/2005 | Topalov et al. | 715/505 |

(Continued)

OTHER PUBLICATIONS

Hallam-Baker, Phillip M., "Client Side Automated Form Entry", download from internet address: http://www.w3.org/tr/wd-form-filling.html, date unknown but prior to date of download, Apr. 3, 2007, 6 pages.

(Continued)

*Primary Examiner* — Laurie Ries
*Assistant Examiner* — Zaida I Marrero
(74) *Attorney, Agent, or Firm* — Aneesh Mehta; Kate Drakos; Micky Minhas (57) ABSTRACT

An arrangement for increasing the accuracy in determining the purpose of fields in electronic forms is disclosed in which a form mapping mechanism describes the layout of a form, for example, by identifying the location of objects on a form—such as text-entry fields, drop-down menus and the like that are used to record user data—and further by specifying the purpose of those objects to a form filling client. Form mapping enables the form filling client to locate and understand the purpose of fields in a form so that it may automatically fill out forms for users in an accurate and reliable manner. Illustrative examples include a form mapping that utilizes hidden tags to describe a form layout, a form mapping service provided to a form filling client over a network, and a user interface that enables form mapping creation through user action.

20 Claims, 6 Drawing Sheets

(56) References Cited

U.S. PATENT DOCUMENTS

| | | | |
|---|---|---|---|
| 2005/0125726 A1* | 6/2005 | Harper et al. | 715/517 |
| 2005/0256841 A1* | 11/2005 | Rawat et al. | 707/1 |
| 2005/0257148 A1 | 11/2005 | Goodman et al. | |
| 2006/0168509 A1 | 7/2006 | Boss et al. | |
| 2006/0179404 A1 | 8/2006 | Yolleck et al. | |
| 2009/0055309 A1* | 2/2009 | Hu et al. | 705/38 |

OTHER PUBLICATIONS

Yau, Sai Ho., "Automating the Extraction of Data Behind Web Forms" A Thesis Proposal presented to the Department of Computer Science, Brigham Young University. Date: Jun. 22, 2000, pp. 1-20.

* cited by examiner

```
<FORM action="http://accountservices.passport.net/prog/accountinfo" method="post">
  <P>
    <LABEL for="firstname">First name: </LABEL> <FORMFILL:FIRSTNAME>  <INPUT type="text" id="firstname"><BR>
    <LABEL for="lastname">Last name: </LABEL> <FORMFILL:LASTNAME>  <INPUT type="text" id="lastname"><BR>
    <LABEL for="gender">Gender: </LABEL> <FORMFILL:GENDER_MALE_RADIO>  <INPUT type="radio" name="gender" value="Male"> Male <FORMFILL:GENDER_FEMALE_RADIO>  <INPUT type="radio" name="gender" value="Female"> Female
    ...
  </P>
```

INCREASING ACCURACY IN DETERMINING PURPOSE OF FIELDS IN FORMS

BACKGROUND

With the increasing popularity of the Internet and World Wide Web to disseminate and facilitate the exchange of information, computer users often need to interact with electronic forms. Such forms are commonly used to automate business transactions in electronic commerce ("e-commerce"), and help to facilitate the streamlined collection of information by all kinds of organizations including government agencies, healthcare providers, financial institutions, schools, libraries and the like.

Users can currently use computer-based form filling software that provides assistance when dealing with a form that is hosted by a website. The form filling software typically examines the form and can help fill it out by using information that the user previously entered and which was stored by the software. These capabilities often let the user save time and can reduce data-entry errors when filling out forms.

While the form-filling software can often perform satisfactorily in many scenarios, it is not always possible for it to accurately and reliably identify all the fields in a form. That is typically because the code used to compose the page, such as HTML (HyperText Markup Language) or XHTML (eXtensible HMTL), does not generally enable the form filling software to determine the purpose of a particular field in the form. Such shortcomings can lead to forms being incorrectly filled out, or some or all fields in a form being missed. While users can sometimes correct or complete the form manually, or the form-filling program can be configured to learn from its mistakes over time, the users' expectations are not necessarily well met by such workarounds. In addition, the organization collecting the information may often incur additional costs in dealing with forms that contain inaccurate or incomplete information which may come about in situations where the user or software do not catch and correct the mistakes.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An arrangement for increasing the accuracy in determining the purpose of fields in electronic forms is provided in which a form mapping mechanism describes the layout of a form, for example, by identifying the location of objects on a form—such as text-entry fields, drop-down menus and the like that are used to record user data—and further by specifying the purpose of those objects to a form filling client. Form mapping enables the form filling client to locate and understand the purpose of fields in a form so that it may automatically fill out forms for users in an accurate and reliable manner.

In an illustrative example, the form mapping mechanism utilizes a set of one or more hidden tags that are embedded in markup, such as HTML or XHTML that is used to compose a form expressed as a webpage which is accessed by users online. The hidden tags locate and describe the purpose of the fields on the page (for example, the first field on the page is intended to be filled out with the user's last name, the second field with the user's first name, etc.). However, the hidden tags do not otherwise affect how the markup is rendered by a browser or application used to access, view, and interact with the page.

In another illustrative example, a form mapping service creates form mappings that are arranged as discretely embodied, standalone objects that are maintained in a database of popular web forms, or other such collection, that are separate from the expression of the forms themselves. Each form mapping is arranged to contain a description of the layout of a particular form, typically including the location and purpose of the fields in the form. The form mappings are downloadable by the form filling client over a network to enable it to accurately fill out the form for the user, such as in cases where the hidden tags described above are not utilized. The user is provided with an opportunity to review the completed form for accuracy, and feedback to the form mapping service is optionally generated by the form filling client if a form is mistakenly filled out as a result of an error in the mapping. The feedback from the client may be combined with other feedback in order to improve the accuracy of the form mapping.

An illustrative user interface is also provided that is arranged to enable the generation of form mappings through user action. The user interface gives the user an easy way to populate fields in a form while simultaneously guiding the form filling client in its determination of the layout of the page. The form filling client may upload data collected from the user action to the form mapping service. The form mapping service typically compares this user action data with other such data from other users in order to either update existing form mappings, or to create and release new form mappings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
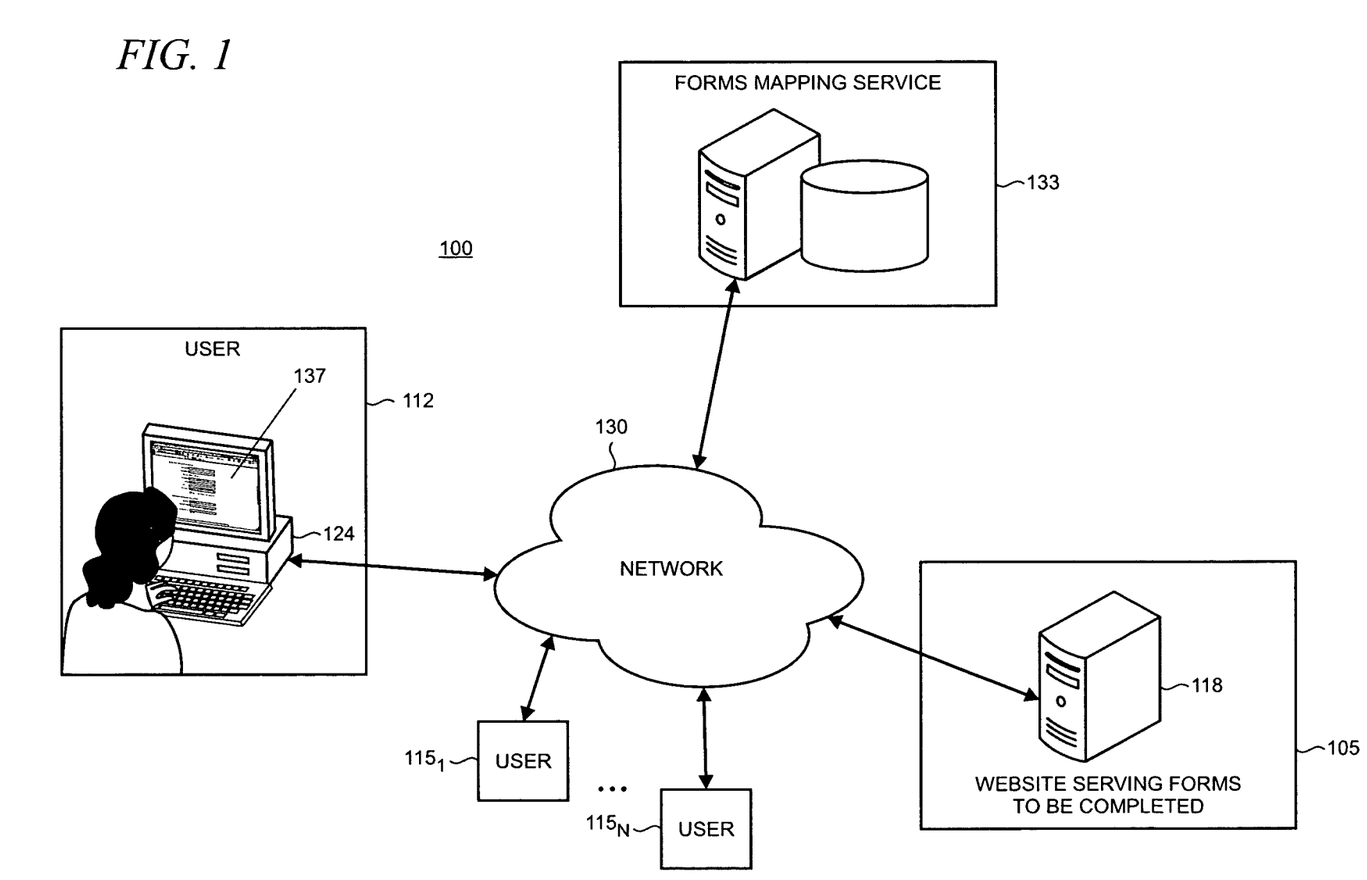
FIG. 1 shows an illustrative networking environment in which the present arrangement for increasing the accuracy in determining the purpose of fields in forms may be implemented.

FIG. 1 shows an illustrative networking environment 100 in which the present arrangement for increasing the accuracy in determining the purpose of fields in forms may be implemented. A website 105 is arranged to serve electronic forms with which information from a user 112 is collected. The website 105 utilizes a web portal 118 (e.g., a server) that communicates with a client computer 124 utilized by a user 112 over a network 130 such as the Internet. In environment 100, a form mapping service 133 is also arranged to communicate with the client computer 124 over network 130. Form mapping service 133 is described in more detail in the text accompanying FIG. 6.

The client computer 124 typically employs a user agent such as a browser (e.g., Microsoft Internet Explorer®, or Mozilla Firefox®) to display the form as a webpage 137 that is displayed by the client computer 124. The user 112 completes the webpage 137 and the captured information is returned to the website 105 to, for example, facilitate a transaction such as an e-commerce purchase. Other users 115-1 . . . N may also be present in the networking environment 100 and be configured with a client computer in a similar manner as with user 112.

Figure 2:
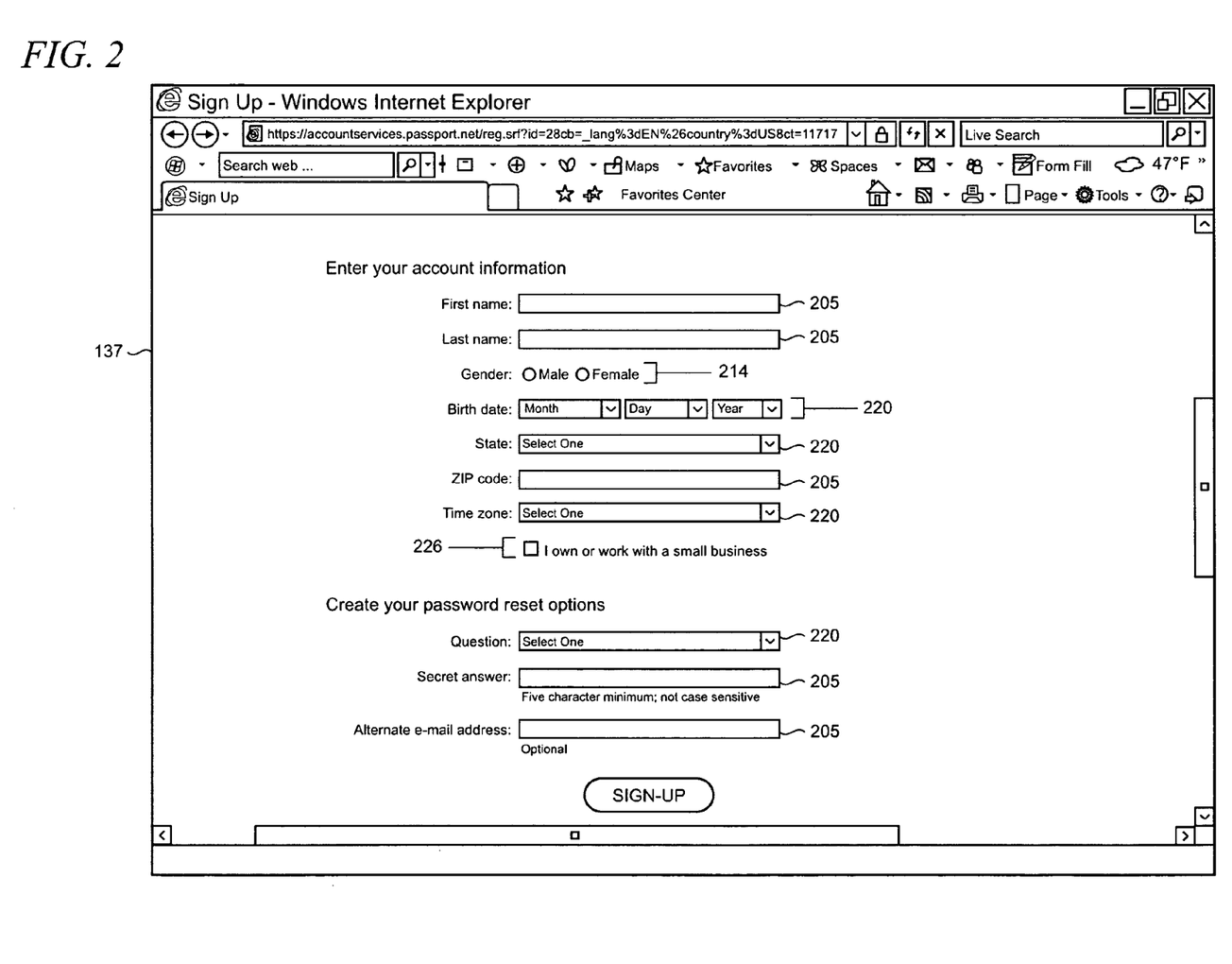
FIG. 2 shows an illustrative electronic form as displayed on a client computer in the networking environment shown in FIG. 1.

FIG. 2 shows an illustrative electronic form which is displayed as webpage 137 on the client computer 124 (FIG. 1) operating in networking environment 100. In this illustrative example, webpage 137 is rendered by Microsoft Internet Explorer which, like many browsers, is capable of displaying web content that is expressed in various types of markup languages including, for example, HMTL and XHTML, specifications for which are maintained by the World Wide Web Consortium ("W3C"). Webpage 137 is representative of the types of forms that are commonly utilized to capture information of interest about a particular user. Here, webpage 137 captures information associated with setting up a new user account with a web-based service.

Webpage 137 is arranged with a multiplicity of different fields and control types that are intended to be filled out by a user. A number of text fields, collectively indicated by reference 205, are utilized in this illustrative example and are intended be populated with text entries by the user. These include fields, for example, for the user's first and last name, ZIP code, etc. Radio buttons 214 are arranged to be toggled to record the user's gender (where radio buttons are distinguishable from regular buttons as they are mutually exclusive—if the "male" gender radio button is switched on, then the "female" gender radio button is switched off and vice versa). Several fields, collectively identified by reference numeral 220, are also included in webpage 137. Field 137 use predefined options that are typically arranged in a drop-down menu from which the user may select. A check box 226 is also included, as shown in FIG. 2.

It is emphasized that the field and control types shown in webpage 137 are merely illustrative, as other fields and control types may be used as required to meet the needs of a specific application. For example, menus, tables, file-upload options, buttons, controls, disabled and read-only controls, active script components and other conventional form components as described in the HTML specifications maintained by the W3C may also be incorporated into a given form. Throughout the remainder of the description that follows the term "field" is used generically to describe any or all objects on a page that are used to capture and/or record user data or input, unless specifically indicated otherwise.

Forms can be very complex and may include many variations that can change or evolve quickly. One result is that existing form filling software can have difficulty in dealing with the markup code to correctly identify all the fields on a form and the purpose for each field. Existing form filling software can typically remember which field gets populated with which information when a user fills out the same form on a recurring basis (which may occur, for example, when the user repeatedly goes to a favorite e-commerce website to make a series of purchases over time).

However, if the website makes a change to the form in between user visits, then the existing software can lose track of the association between the information and the form and make errors. This occurs because the existing software generally only associates a string of text or numbers with a particular field on the form, but has no actual knowledge of what that string represents. That is, algorithms used in the existing form filling software are unable to derive the purpose of the fields from the markup itself or from the actions of the user when completing a form. Existing software remembers a particular string of letters and numbers, but generally has no way of understanding that the string is an address, for example. This deficiency in accurately identifying the purpose of fields in a form, among others, is addressed by the present arrangement, as described below in the text accompanying FIGS. 3-7.

Figure 3:
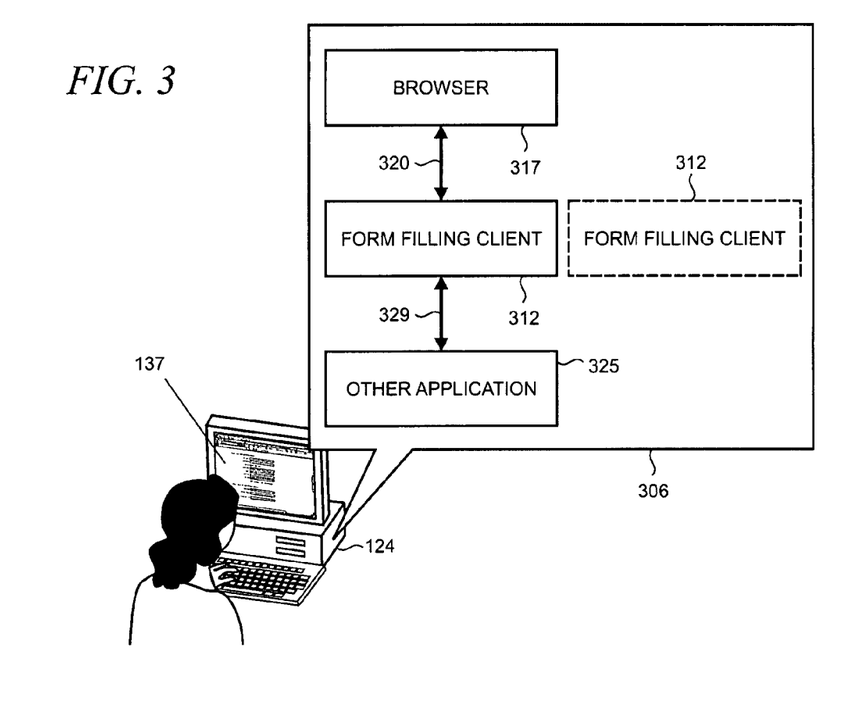
FIG. 3 shows an illustrative software architecture that is operable on the client computer shown in FIG. 1.

Continuing with the description of the networking environment 100 in which the present arrangement may be implemented, FIG. 3 shows an illustrative software architecture 306 that is operable on the client computer 124. Client computer 124 is representative of all the client computers in the environment 100 (i.e., those utilized by the other respective users 115).

Architecture 306 includes a form filling client 312 that is arranged to provide several functionalities, particularly including support of a mapping mechanism with which locations of fields in a form and the purpose of each field may be deterministically derived. It is noted that the term "purpose" as used here means an intended design goal for the field regarding the specific meaning of the data that it holds or captures. For example, the form mapping may identify a field's purpose by using a human-readable explicit label such as "Street Address" for a particular field, the purpose of which is to record a user's street address. However, a field's purpose may also be identified by a form mapping through use of semantic abstractions such as identifications codes or other specialized syntax.

As described below in the text accompanying FIG. 4, the form mapping may be implemented as part of the markup that is used to compose the form (i.e., the webpage) where the form mapping is parsed by the form filling client 312 in order to understand the form, including the location of fields on the form and the purpose for each field. Alternatively, or in combination with the mapping embedded in the markup, the form mapping may be implemented as a standalone mapping that is provided, for example, as one or more files or updates that the form filling client 312 may download from the form mapping service 133 (FIG. 1), as described in the text accompanying FIG. 6.

Form filling client 312, in many applications will be embodied to operate closely with a browser 317 as shown by arrow 320 in FIG. 3. In this case, the functionality provided by form filling client 312 is directly incorporated into browser 317, or is alternatively implemented as an extension, plug-in, add-in, browser helper object ("BHO") or some other code that is written to provide or expand the functionality of the browser with form filling functionality which includes support for the present mapping mechanism.

Another alternative that may be utilized in other applications is to directly incorporate the functionality provided by form filling client 312 into another application 325 (i.e., a non-browser application) that is operating on client computer 124. Alternatively, the functionality of the other application 325 may be expanded by implementing the form filling client 312 as an extension, plug-in, add-in, or other code to supplement the capabilities provided by the application 325 with the present mapping mechanism, as indicated by arrow 329.

Application 325 may take a variety of alternative forms. For example, application 325 may be arranged as a form viewer that enables a user to view and complete forms composed in markup, or forms expressed in other formats including, for example, page description languages such as Adobes PDFO, Adobe Postscript®, XPS (XML Paper Specification), and word processing formats such as Microsoft-Word® (i.e., files having a .doc extension).

In addition to being arranged to operate with the browser 317 or other application 325, the form filling client 312 may be optionally implemented as a standalone application, as indicated by the dotted rectangle in FIG. 3. As a standalone application, the form filling client 312 will generally be arranged to include a user interface to navigate to, view, and complete forms (where such capabilities are provided by the browser or other application in the examples above), in addition to the form filling capabilities that support the present mapping mechanism.

Figures 4A, 4B:
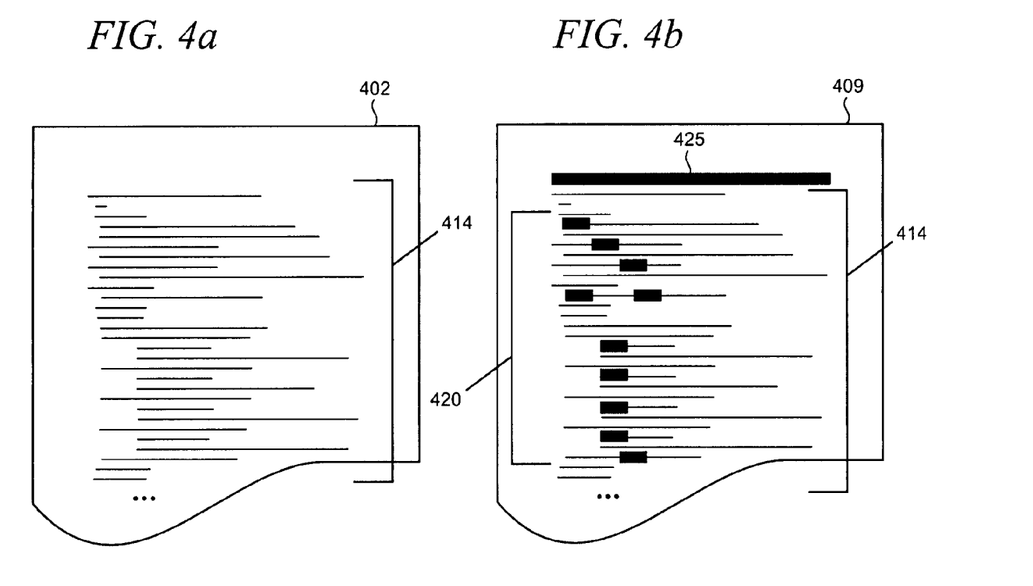
FIGS. 4a and 4b show, respectively, an illustrative original markup and an illustrative markup in which one or more hidden tags are embedded to implement one example of the present form mapping mechanism.

FIGS. 4a and 4b respectively show an illustrative original markup document 402, and an illustrative markup document 409 in which one or more hidden tags are embedded in order to implement the present form mapping mechanism. FIG. 4a includes a simplified graphical representation of multiple lines of markup code 414, for example expressed in HTML or XHTML, that when rendered at the client computer 124 (FIG. 1) display a form such as webpage 137.

FIG. 4b includes a simplified graphical representation of a set of hidden tags 420 that are embedded in the markup code 414. The hidden tags 420 that are used to implement the mapping mechanism in which a description of the layout of the webpage is provided to the form filling client 312. In typical applications, the description includes an identification of locations of the fields in the form and the purpose of each field. It is emphasized that the hidden tags 420 are merely illustrative of a variety of coded enumerations that are known in the art and which may utilized in accordance with the present arrangement to describe the layout of a form.

By "hidden," it is meant that the tags 420 are human-viewable in the markup 409, but are not displayed on the form when it is rendered by the client computer 124, nor do the tags 420 affect how the markup in the document, which defines the form's content and its presentation, is interpreted or acted upon by the browser 320 or other application 325 (FIG. 3).

As shown in FIG. 4b, the tags 420 comprise a set of individual tags that are interspersed in the markup 414 and which are parsed by the form filling client 332 when a page is rendered by the client computer 124. The tags 320 instruct the form filling client 332 as to the location of each field on the page, as well as describe the purpose of the fields to thereby give the form filling client 332 much more information about the form in order to increase the accuracy and reliability of the form filling client 332 when it completes the form for the user 112 (FIG. 1).

Figure 5:
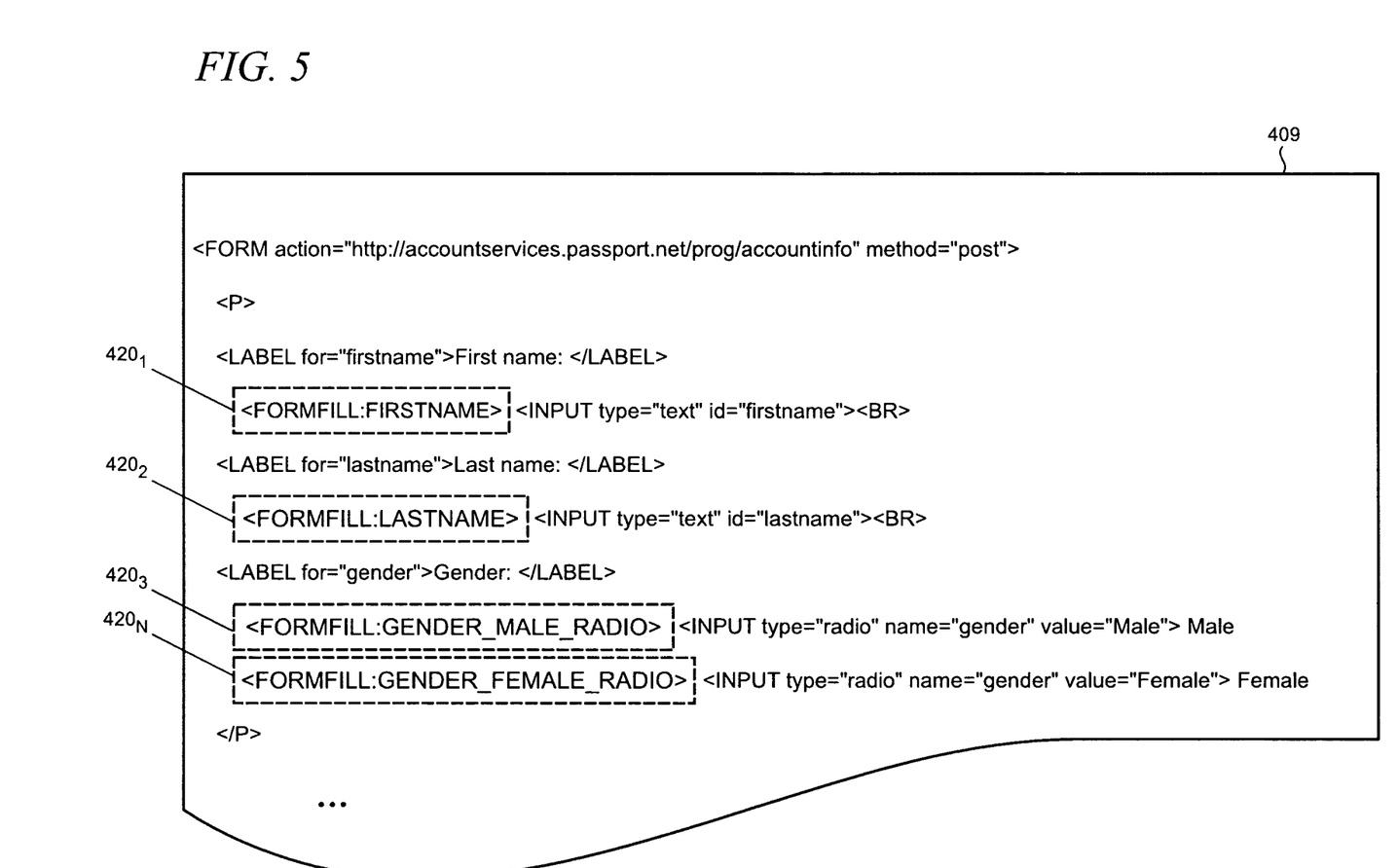
FIG. 5 shows details of an illustrative markup that includes several hidden tags used to implement a form mapping mechanism.

FIG. 5 shows details of a portion of the illustrative markup 409 that includes several hidden tags 420 used to implement the present mapping mechanism. As shown in FIG. 5, in this illustrative example, an individual tag is positioned prior to each element in the markup that is used to create the fields for the form displayed by webpage 137 in FIG. 1 (note that style and formatting is not shown in the markup in FIG. 5 for clarity). Accordingly, each tag 420 explicitly identifies the location of a field on the page.

For example, tag $420_1$ <FORMFILL:FIRSTNAME> is inserted before the markup element describing the first name field and tag $420_2$ <FORMFILL:LASTNAME> is inserted before the last name field in the markup 409. Similarly, tag $420_3$ <FORMFILL:GENDER_MALE_RADIO> and $420_N$ <FORMFILL:GENDER_FEMALE_RADIO> specifies the location of the buttons used to capture a gender designation on webpage 137 and describe that the control type being used include radio buttons. Other tags (not shown) would follow a similar schema as required to locate and describe the remaining fields in the webpage 137.

Several alternative tag schemas may also be utilized to meet the requirements of a specific application. Referring back to FIG. 4, in addition to the tags 420 which are typically distributed throughout a markup document, a single tag 425 that locates and describes all or some of the fields in a form from a central location on the markup may be utilized. The single tag 425 may be positioned, for example as shown in FIG. 4, at the top of the markup 409, although other locations may also be utilized.

A compound tag arrangement may also be utilized. A compound tag includes mapping and description of more than one field in a form. For example, if a form uses a series of fields that are sequentially arranged on the form to accept text entry of a user's name, street address, city, and telephone number, a compound tag such as <FORMFILLLAYOUT:NAME:ADDR:CITY:PHONE> may be embedded in the markup prior to the name field in the form to identify the purpose of each field and implicitly identify the location of the fields. In other alternative arrangements, distributed tags, compound tags and centrally located tags may be used in various combinations as may be required to meet a particular setting or application.

The hidden tags used to implement the present mapping mechanism may be composed and embedded in a markup for a given form as it is being authored. For example, in some scenarios it is contemplated that the webpage designer for the site serving the forms (e.g., website 105 in FIG. 1) will compose the tags and place them in the markup for the form during its design and development prior to being published by the site. When a user hits the site, the tags will be parsed and acted upon by the form filling client 312 inline as the browser renders the markup. Since the site is generally benefitted by having forms completed in a reliable and accurate manner, as for example when a completed form results in a sale of a good or service, the site and designer are motivated to use the form mapping tags to assist the form filling client 312 to accurately complete the designer's form.

Figure 6:
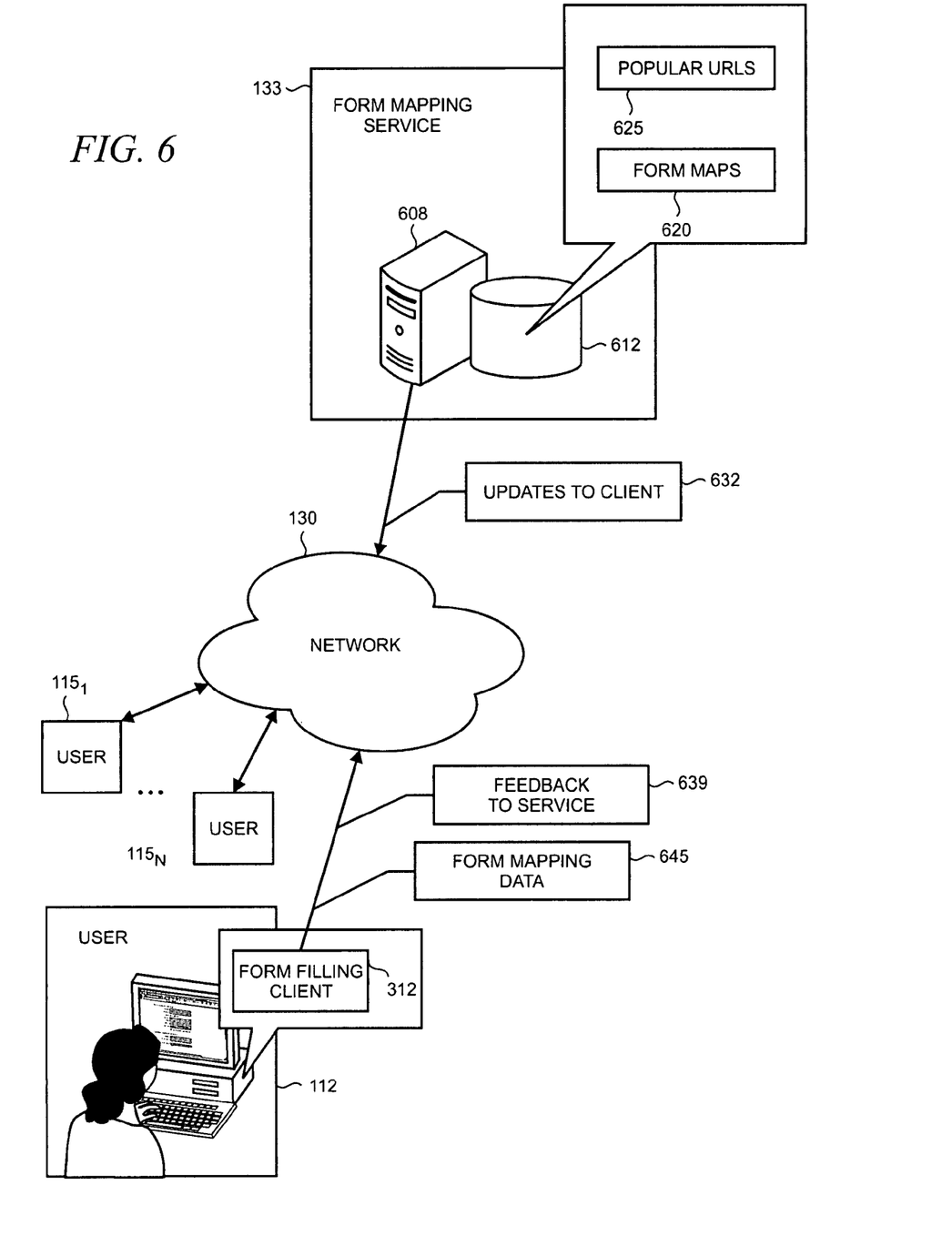
FIG. 6 shows details of the form mapping service shown in FIG. 1 and the information exchanged between the form mapping service and a form filling client.

FIG. 6 shows details of the form mapping service 133 shown in FIG. 1 and the information exchanged between the form mapping service 133 and the form filling client 312. The mapping mechanism utilized by the form mapping service 133 enables forms to be mapped using an alternative to the hidden tags shown in FIGS. 4b and 5 and described in the accompanying text.

Form mapping service 133, in this illustrative example, utilizes a server 608 and a database 612 in order to provide a service over the network 130 to users such as users 112 and 115. Database 612 is arranged to store form mappings 620 of popular forms that are indexed by URL (Uniform Resource Locator) as indicated by reference numeral 625. Popular forms are those which a relatively large number of users tend to want or need to complete on a regular basis such as those associated with e-commerce transactions, subscription services, and the like. Other collections of form mappings may also be utilized in some arrangements. Such collections may, for example, be tailored to particular targeted users, relate to common subject matter or publishers, involve similar form construction, themes, or appearance, or otherwise have sufficient relevance to users in some manner to be included in a form mapping collection.

Unlike the mapping mechanism described above that uses the hidden tags that are processed inline with the markup, form mappings 620 are arranged, in this illustrative example, as standalone documents that are provided over network 112 in the form of updates 632 to the form filling client 312. In some applications of the present arrangement, the form mappings will be served from a separate location (i.e., server) from the forms themselves. Alternatively, the form and form mappings may be served from the same server, using an address convention such as:

Form address:
        http://www.microsoft.com/forms/form1.html
    Form mapping address:
        http://www.microsoft.com/forms/
            form1mappingfile.xml where form1.html is the form file and form1mappingfile.xml is the form mapping file.

The form filling clients on the users' client computers may interact with the form mapping service 133 using a publish and subscribe model by which the form filling client 312 receives regular updates for new form mappings for new URLs added to the list of popular URLs, or to receive revised mappings for a form that may have changed or for a form that originally contained mapping errors. Alternatively, the updates 632 may be provided by request from a calling form filling client 312.

Form mappings 620 may be written, for example, using a declaratory markup such as XML (eXtensible Markup Language). Although the structure of a standalone form mapping differs from that used with the embedded inline hidden tags, the semantics expressed by the form mapping is the same—each form mapping 620 expresses the locations of fields in the form that it is mapping, along with an identification of the purpose of each field.

While webpage authors are certainly able to create standalone form mappings that are valid against the current arrangement, mapping authors do not necessarily need to be affiliated with the publishers of the forms. A mapping author can take virtually any form that is published on the web and create a mapping through inspection and interaction that describes its field locations and associated purposes. Generally, knowledge of the underlying markup or script that might be used to implement a form is not necessary to create an effective form mapping.

Since a form mapping 620 is a standalone document (e.g., an XML document) the form filling client 312 has flexibility in how it processes the mapping to retrieve the salient information about the mapped form. For example, it may process the form mapping side-by-side (i.e., in parallel) with the browser as it renders markup code (e.g., HTML or XHMTL) for the form. Or, the form filling client 312 may process the form mapping before or after the markup for the form is rendered by the browser. In all cases, as the form is displayed by the browser on the user's computer, the form filling client 312 can take the results of the form mapping processing to accurately complete the form for the user.

As indicated by reference numeral 639 in FIG. 6, feedback from the form filling client 312 may be sent back to the form mapping service 133. Feedback 639 may be optionally utilized in instances when a particular form mapping provided by the form mapping service 133 does not enable its associated form to be completed accurately. For example, the form mapping-might have originally been composed with an error. Or, the form mapping may have become outdated because its associated form changed in between the time the mapping was created and time the form filling client attempted to complete the form using the mapping.

Feedback 639 can be provided to the form mapping service 133 to help identify errors in the mapping. Typically, the form filling client 312 will automatically capture the errors in response to a user's manual corrections to a form that was filled out incorrectly by the client 312. For example, a mapping might incorrectly indicate to the form filling client 312 that the purpose of a particular field is for a street address when its true purpose is for a city. Based on the form mapping, the form filling client 312 will incorrectly fill out the city field with the user's street address. In typical applications, the user is presented with an opportunity to review a form completed by the form filling client 312 before the form gets submitted back to the site. If the user should catch the mistake and manually correct it with the correct city, then the form filling client 312 will recognize that a manual correction was made (since the revised entry by the user does not match the original entry made by the form filling client) and generate a flag or message to indicate that there is a potential error with field purpose identified in the form mapping. The flag is sent as part of the feedback 639 to the form mapping service 133.

The form mapping service 133 can compare and/or correlate the feedback 639 with feedback received from other users about the same form. Once a sufficient level of feedback is received about the form to indicate that a genuine problem exists with an acceptable level of confidence, then an alert may be raised to an administrator for the identified form mapping to be manually reviewed for accuracy. Once corrected or revised, the form mapping can be made available again for download to the form filling client 312 as an update 632.

Figure 7:
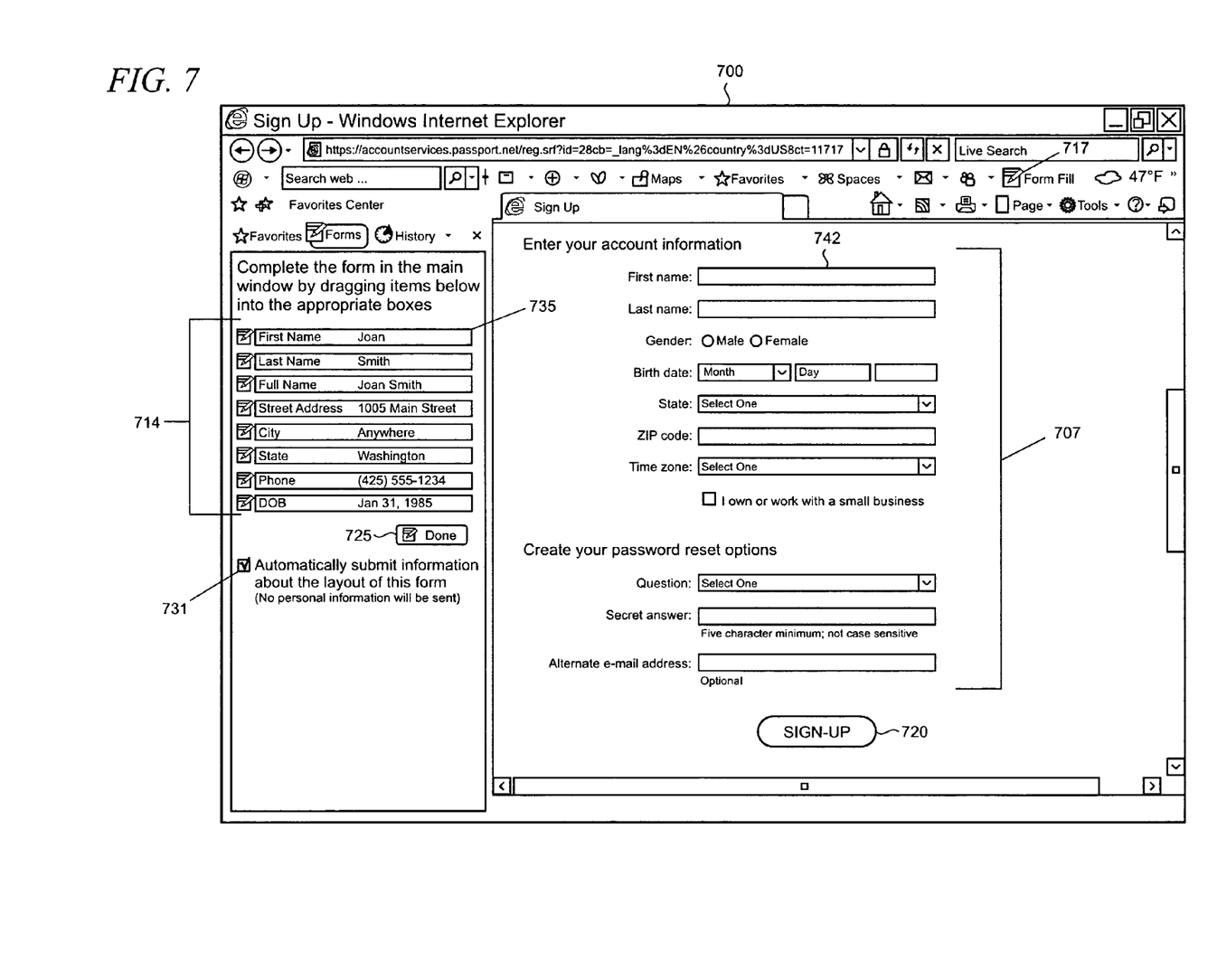
FIG. 7 shows an illustrative user interface by which user action facilitates form mapping.

In addition to providing feedback as discussed above, the form filling client 312 may be optionally arranged to collect, through user action, form mapping data 645 which is reported to the form mapping service 133. In one illustrative implementation of such arrangement, the form filling client 312 interoperates with a browser (e.g., browser 317 shown in FIG. 3) to display a user interface by which a user is assisted in filling out a form, while the form filling client is arranged to simultaneously collect form mapping data that can be used by the form mapping service 133 to update existing form mappings or create new form mappings. FIG. 7 shows an illustrative example of such a user interface.

As shown, a form filling user interface is displayed as a webpage 700 by the browser 317 using expanded functionality as provided by the form filling client 312, for example by being arranged as an extension, plug-in, BHO, etc., as discussed above in the text accompanying FIG. 3. Webpage 700 includes a portion that is used to display a form containing a variety of fields 707 to be filled out. Note that the form shown in FIG. 7 is the same as the form displayed as webpage 137 shown in FIGS. 1 and 2. In this illustrative example, the fields 707 in the form are assumed to not have been previously mapped, for example, using either the embedded tags or standalone mapping mechanisms described above. In addition, the form is assumed to be new to the user (i.e., it has not been previously encountered by the user during a prior interaction or transaction).

Webpage 700 further includes a form filling user interface that is used to display a set of pre-completed form entries 714 including first name, last name, full name, street address, etc. that reflect information associated with the user 112 (FIG. 1). In some applications, the pre-completed entries are automatically displayed when the user 112 navigates to a page that contains form fields. Alternatively, the user 112 may invoke the form filling client 312 to display the user interface and pre-completed form entries, for example, by clicking an icon 717 in the toolbar of the webpage 700.

Form entries 714 were previously input by the user 112 using a screen (not shown) displayed by the form filling client 312 that is arranged to collect commonly used form information and store it for later use. It is emphasized that the set of pre-completed form entries 714 shown are merely illustrative and other sets of pre-completed form entries may be used that are different from those shown. In addition, conventional navigation objects (e.g., scroll bars, drop down lists, etc.) may be utilized to enable users to select from a larger group of pre-completed form entries than that shown in FIG. 7.

The user interface implemented by webpage 700 is configured to enable the user 112 to select one of the pre-completed form entries and then drag and drop it to populate the appropriate one of the fields 707 in the form with the respective string contained in the pre-completed form entries. The user continues to select, drag, and drop pre-completed form entries 714 into the appropriate fields 707 until the form is completed. As these events occur, the form filling client 312 tracks the user's association of the pre-completed form entries 714 to the fields 707 in the form to thereby generate form mapping data.

Upon completion, the user 112 may submit the completed form to the publishing site for processing which, in this illustrative example, is effectuated by clicking the "Sign-Up" button 720 at the bottom of the form.

When the user is finished using the form filling user interface, the "Done" button 725 may be clicked to unload the form filling client 312 or hide the user interface on the page. The user is further provided an option, via a checkbox 731, to submit the form mapping data created from the tracked associations to the form mapping service 133. If this option is selected, then the form mapping data, as indicated by reference numeral 645 in FIG. 6, is sent via the network 130 to the form mapping service 133.

Typically, no personal data about the user 112 is submitted. Instead, only the tracked associations between the purpose of the pre-completed form entries and the fields on the forms are sent. That is, for example, the form filling client 312 notes that the pre-defined form entry box 735 in FIG. 7, which is used for the first name, was associated by the user 112 with the first field 742 at the top of the form. Therefore, the form filling client 312 sends this data to the form mapping service 133 to indicate field purpose and location as part of the form mapping data 645. It does not send the data string "Joan" entered by the user 112 to the form mapping service 133.

The form mapping service 133 can compare and/or correlate the form mapping data 645 with data received from other users about the same form. Once a sufficient level of form mapping data is received about the form to indicate that the mapping created through user action is accurate with an acceptable level of confidence, then the form mapping service 133 will generate a new form mapping based on the collective user-supplied data. Such form mapping can be made available for download to the form filling client 312 as an update 632.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing a form mapping service to a form filling client on a client computing device, the method comprising:
   sending, from a form description server computing device that is remote from the client computing device and that is accessible to multiple other client computing devices, a description of a form to the client computing device, wherein:
      the form:
         includes multiple objects that are to be employed to record user data; and
         was received by the client computing device from a server other than the form description server computing device;
      the description of the form:
         specifies a purpose for each of the multiple objects; and
         enables the form filling client on the client computing device to automatically enter data previously stored on the client computing device into the form; and
   receiving, by the form description server computing device from the form filling client on the client computing device, feedback regarding a potential error in the description of the form; and
   based at least in part on the received feedback, alerting, by the form description server computing device, an administrator of the description of the form of the potential error in response to a level of feedback regarding the potential error in the description of the form reaching a confidence level.

2. The method of claim 1, wherein the description includes an indication of a location of at least one of the multiple objects within the form.

3. The method of claim 2, wherein the at least one of the multiple objects comprises one of a menu, a table, a script, and a pre-selected option.

4. The method of claim 1, wherein the method further comprises revising the description of the form responsively to the feedback.

5. The method of claim 1, wherein sending the description of the form includes sending the description of the form under a publish and subscribe model.

6. The method of claim 1, further comprising:
   receiving the description of the form from an author of the form.

7. The method of claim 1, wherein the feedback was generated by the client computing device in response to detection of manual correction of data automatically entered into the form by the form filling client on the client computing device.

8. The method of claim 1, wherein
   at least a first of the multiple objects comprises a menu, at least a second of the multiple objects comprises a table, at least a third of the multiple objects comprises a script, and at least a fourth of the multiple objects comprises a pre-selected option.

9. A method for interacting with a form mapping service provided by a form description server computing device with a form filling client on a client computing device, the method comprising:
   receiving, by the client computing device from a website serving computing device, a form, wherein the form:
      includes multiple objects for recording user data;
   receiving, by the client computing device from the form description server computing device, a description of the form, wherein:

the form description server computing device is:
remote from the client computing device and provides the form mapping service to multiple other client computing devices; and
separate from the website serving computing device; and
the description of the form:
specifies a purpose for each of the multiple objects; and
enables the form filling client on the client computing device to automatically enter data previously stored on the client computing device into the form;
automatically entering, by the client computing device, the previously stored data into the form based on the received description of the form;
detecting, by the client computing device, a manual correction of the data automatically entered into the form; and
in response to the detection of the manual correction, transmitting, by the form filling client on the client computing device, an indication of a potential error in the description of the form, wherein the indication of the potential error in the description of the form is employed by the form description server computing device to alert an administrator of the description of the form of the potential error in response to a level of feedback regarding the potential error in the description of the form reaching a confidence level.

10. The method of claim 9, wherein
automatically entering the previously stored data into the form includes:
entering the previously stored data into one or more of the multiple objects of the form based on the received description of the form; and
detecting the manual correction of the data includes:
detecting a manual correction of the data automatically entered into at least one of the one or more of the multiple objects of the form.

11. The method of claim 9, wherein
at least a first of the multiple objects comprises a menu, at least a second of the multiple objects comprises a table, at least a third of the multiple objects comprises a script, and at least a fourth of the multiple objects comprises a pre-selected option.

12. A form description server computing device for providing a form mapping service to a form filling client on a client computing device, the form description server computing device including a memory and a processor, the memory and the processor being respectively configured to store and execute computer-executable instructions, including computer-executable instructions to:
send, from the form description server computing device that is remote from the client computing device and that is accessible to multiple other client computing devices, a description of a form to the client computing device, wherein:
the form:
includes multiple objects that are to be employed to record user data; and
was received by the client computing device from a server other than the form description server computing device;
the description of the form:
specifies a purpose for each of the multiple objects; and
enables the form filling client on the client computing device to automatically enter data previously stored on the client computing device into the form; and
receive, by the form description server computing device from the form filling client on the client computing device, feedback regarding a potential error in the description of the form; and
based at least in part on the received feedback, alert, by the form description server computing device, an administrator of the description of the form of the potential error if a quantity of feedback regarding the potential error in the description of the form reaches a confidence level.

13. The form description server computing device of claim 12, wherein the description of the form further comprises:
an indication of a location of each of the multiple objects within the form.

14. The form description server computing device of claim 12, wherein at least one of the multiple objects comprises a menu.

15. The form description server computing device of claim 12, wherein at least one of the multiple objects comprises a table.

16. The form description server computing device of claim 12, wherein at least one of the multiple objects comprises a script.

17. The form description server computing device of claim 12, wherein at least one of the multiple objects comprises a pre-selected option.

18. The form description server computing device of claim 12, wherein at least a first of the multiple objects comprises a menu, at least a second of the multiple objects comprises a table, at least a third of the multiple objects comprises a script, and at least a fourth of the multiple objects comprises a pre-selected option.

19. The form description server computing device of claim 12, wherein
the description of the form is sent by the form description server computing device to the client computing device according to a publish and subscribe model.

20. The form description server computing device of claim 12, wherein the feedback was generated by the client computing device in response to detection of manual correction of data automatically entered into the form by the form filling client on the client computing device.

* * * * *